UNITED STATES PATENT OFFICE.

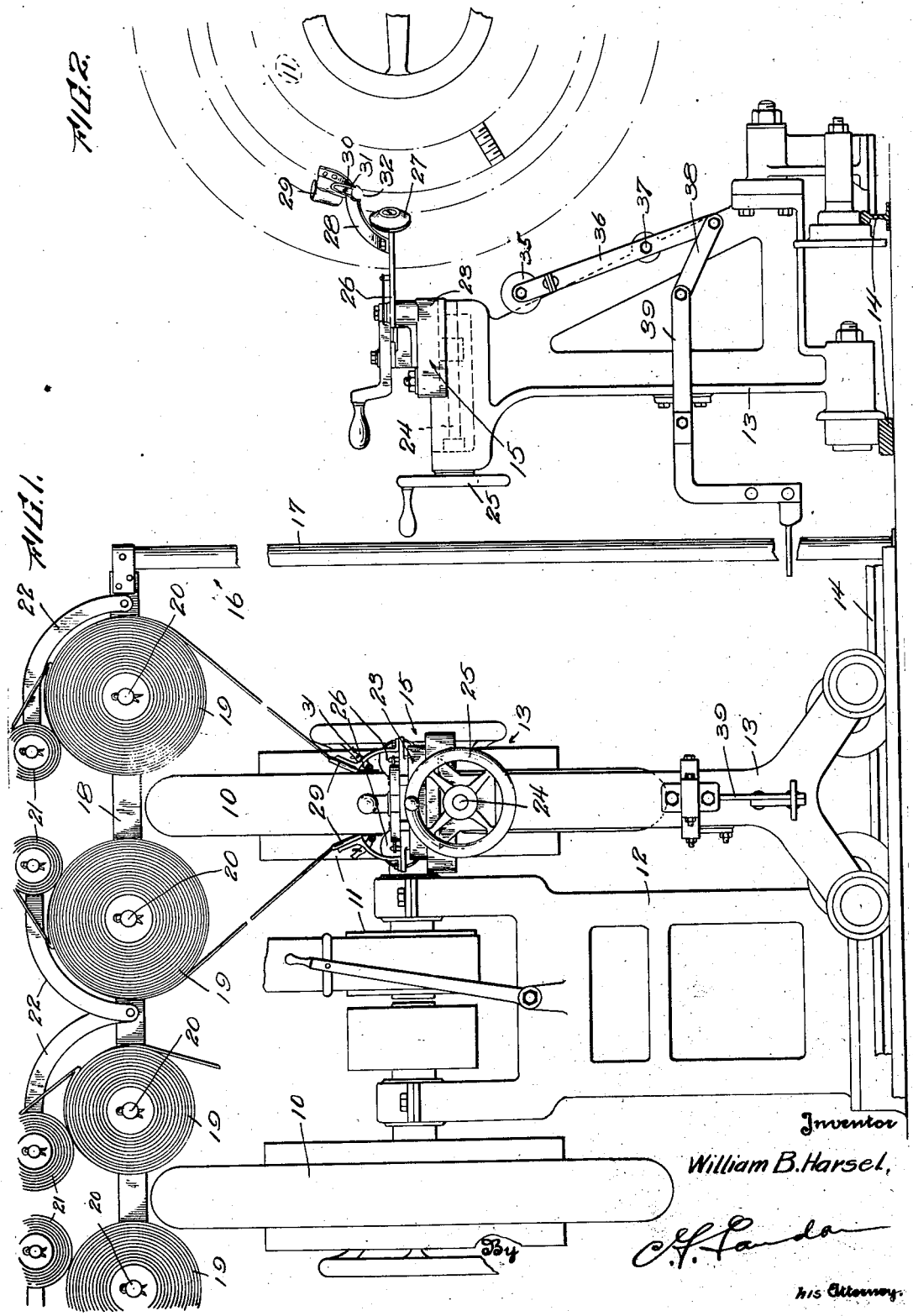

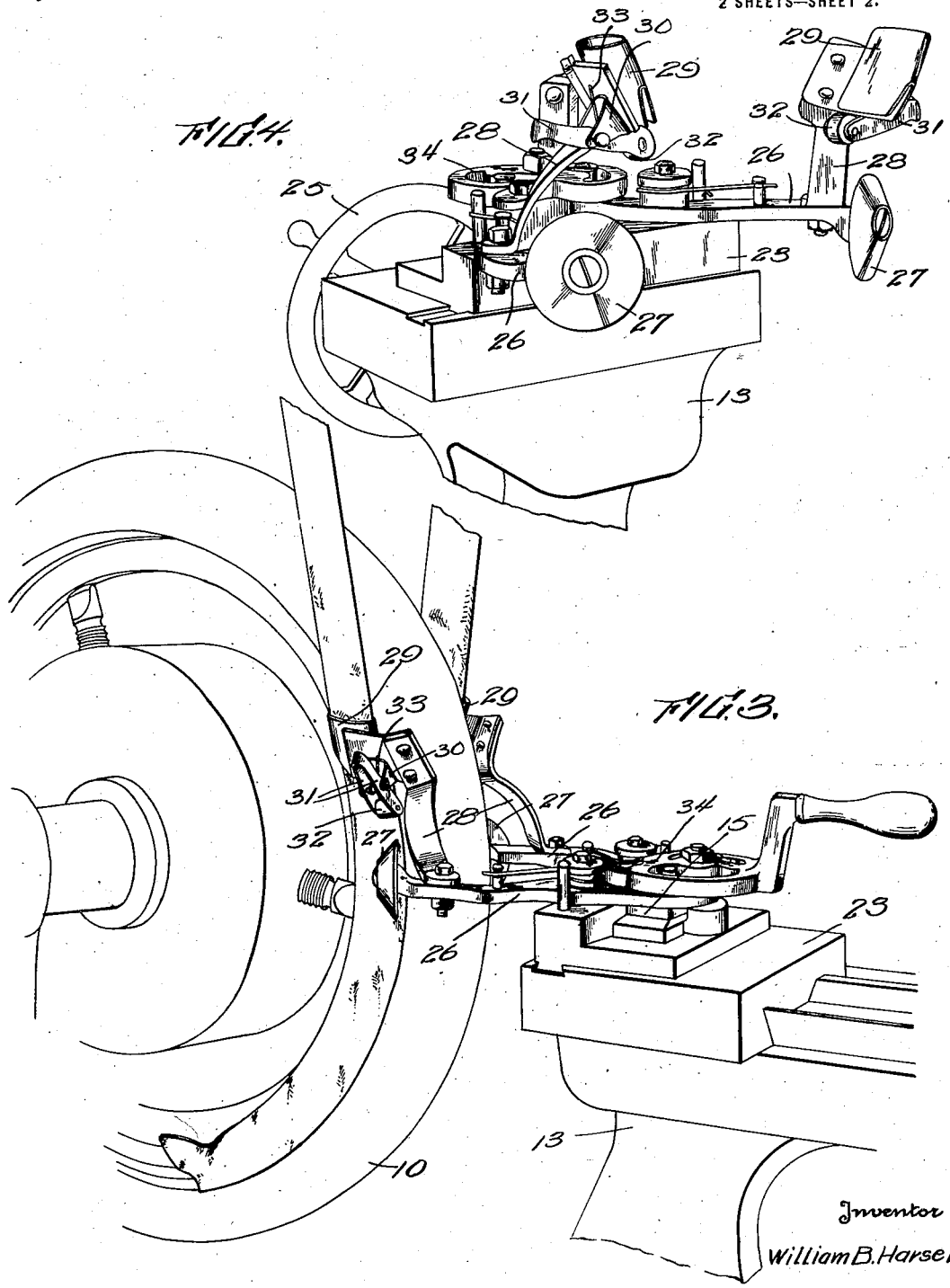

WILLIAM B. HARSEL, OF AKRON, OHIO, ASSIGNOR TO THE GOODYEAR TIRE & RUBBER COMPANY, OF AKRON, OHIO, A CORPORATION OF OHIO.

TIRE-MAKING MACHINE.

1,327,910.  Specification of Letters Patent.  Patented Jan. 13, 1920.

Application filed July 20, 1918. Serial No. 245,864.

*To all whom it may concern:*

Be it known that I, WILLIAM B. HARSEL, a citizen of the United States, and resident of Akron, Ohio, have invented new and useful Improvements in Tire-Making Machines, of which the following is a specification.

This invention relates primarily to tire-building machines, and more particularly to a structure for applying certain so-called "finishing" strips to the carcass which eventually becomes the casing of a pneumatic tire.

This carcass is customarily built up on the carcass-forming core of a plurality of successively-applied plies of rubberized fabric. In building tires of the pneumatic type, it is usual practice to apply the several different kinds of strips to this carcass by hand and, generally, as separate and successive operations. The carcass having been finished, the first finishing element applied thereto is the so-called "chafing" strip which comprises a narrow strip of rubberized fabric which is applied to the carcass so that it will entirely cover the bead. The next elements to be applied are the so-called "side-walls" which, under the present modus of factory procedure, comprise a series of thin, narrow rubber strips which are applied to the sides of the carcass separately, these being so positioned in respect to the beads that there shall be a substantial amount or bulk of rubber built up against these beads.

The final step in this procedure is to apply the so-called "cushion" strip, this being applied about the outer circumference of the carcass which, by its application, becomes a completed carcass and ready for its initial cure.

These several operations not only require a considerable time but involve care and accuracy on the part of the tire-builder to insure the making of a satisfactory product; and, besides, involve several steps and operations.

The principal object of my invention is to eliminate what I regard as unnecessary steps in this procedure and to effect a convenient and easy application of the chafing strip and side-walls to the carcass.

To this end, my invention primarily resides in means for accurately and positively placing these various finishing strips on the carcass and thereby avoid unsatisfactory guess-work on the part of the tire builder.

These and other important objects and advantages, that will be apparent from the following description, may be accomplished by the structure illustrated in the accompanying drawings which are, however, intended merely to be illustrative, since this structure is susceptible of a wide range of modification and variation without departing from the spirit of the invention or sacrificing any of its salient features or underlying principles.

In these drawings:

Figure 1 is a view in front elevation of the structure, there being two carcass-forming cores shown therein;

Fig. 2 is a fragmentary view in side elevation of the same;

Fig. 3 is a fragmentary view, in perspective, showing the stitcher-head and a portion of the carcass-forming core; and Fig. 4 is a similar view illustrating the stitcher-head on a larger scale and showing more clearly the strip-laying rollers and positioning-guide forming a part of the structure.

Referring to these drawings, the reference-numeral 10 designates a carcass-forming core of any suitable construction and dimensions, there being two of these here shown; but it is to be understood that there may, if desired, be several of them arranged in series. Each of these cores is supported upon a core-chuck and drive, designated generally by the reference-character 11, these instrumentalities being sustained by a pedestal or standard 12.

Adapted to travel in front of the standard 12 and to be positioned in operative relation to one or another of the cores 10 is a unit-supporting carriage 13 which traverses tracks 14.

On this carriage is mounted a stitcher-head unit, designated generally by the reference-numeral 15, the details of which will hereinafter be more fully described.

Juxtaposed to the structure just described is a roll-supporting frame 16 comprising posts 17 and a cross-piece 18: On this cross-piece is mounted a series of fabric supply-rolls 19, a pair of these being accurately positioned over each core so that the operator may simultaneously apply two strips of fabric therefrom onto the core. It is to be understood that, although I have here shown these rolls as carrying material for chafing strips; nevertheless they may likewise carry material for the side-wall and cushion strips, these to be applied from these rolls to the core in a manner similar to that which will hereinafter be explained. In other words, these various rolls are to be interchangeably mounted on the cross-piece 18; and, to this end, the rolls are supported on a series of studs 20.

Disposed in a plane above the rolls 19 are liner take-up rolls 21, these being mounted on curved supports 22 pivoted on the cross-piece 18, as shown in Fig. 1. These rolls are held in engagement with the fabric-rolls 19 by the force of gravity and, as these rolls rotate, they will in turn cause the liner rolls to rotate and, thus, take up liner material from the rolls 19 as the latter rotate to supply strips to the core.

The aforementioned stitcher-head unit 15 includes a carriage 23 adapted to have advancing and receding movements in respect to the core 10, such movements being effected by a driving-screw 24 which is operated by a hand-wheel 25.

Mounted on and carried by the carriage 23 is a pair of cam-operated stitcher-arms 26 carrying stitcher-rolls or disks 27 at their outer extremities. Bolted to and upstanding from each of the arms 26 is a bracket 28 which supports a strip-guide 29. On the under-side of each guide is a bracket 30 which pivotally supports a U-shaped yoke 31 carrying a fabric-laying roller 32. The function of these rollers is to press the strips against the core, the yokes 31 acting under the influence of a spring 33 for this purpose.

The arms 26 are actuated by a manually-operated cam-member 34, and by which the arms 26 are positioned in respect to the fabric being laid upon the core.

*Operation.*—In operating the structure, above described, the tire builder first places the required carcass-covered cores upon the series of chucks. Thereupon, he positions the carriage 23 in front of the first core and operates the hand-wheel 25 to cause the carriage to be advanced into a position where the fabric-guides 29 will be in close proximity to the beads on the carcass. Then the ends of the fabric-strip are threaded through these guides 29 and under the roll 32, so that they may be attached to the carcass. The nature of the rubberized fabric is such as to cause these ends to adhere to the carcass while the operator causes the core slowly to revolve until a complete strip of the fabric has been positioned over the entire bead; this operation occurring simultaneously on both sides of the core. The fabric, then being severed at the proper length from the main supply on the rolls 19, the core is then set into rapid operation. The stitcher-carriage is next advanced slowly toward the core and, at the same time, the sticher-disks 27 are, by the manually-operated cam-member 34, forced inwardly to engage the strip—be it a chafing or side-strip—the simultaneous action of these supplying rolls and the radial movement of the carriage 23 resulting in the supplying rolls traversing practically the entire width of the strip; these operations being continued until the strip is completely stitched down over the beads. Then the carriage 23 is retracted and the unit-supporting carriage 13 is positioned in front of the next core, whereupon it is operated in the manner just described. These operations are continued until all of the cores have been finished.

If desired, the aforementioned cushion strip may be applied by positioning a strip-laying roller 35 against the tread-portion of the carcass. This roller is mounted at the upper extremity of a lever 36 pivoted at 37 and actuated by link 38 which in turn is pivotally connected to a foot-lever 39.

From the foregoing, it will be perceived that in this structure a combined strip-applying and stitcher device are mounted upon and operated by the arms 26, which, in turn, are operated by the member 34, this being common to both of the arms to effect simultaneous movement of the arms 26. Moreover, while the guides 29 are positioning the strips in proper relation to the beads on the carcass, the rolls 32 are operating to effect a preliminary laying of these strips on the beads whereupon the stitcher-disks 27 are brought into operation to complete the stitching down of these strips.

What I claim is:

1. A strip-applying structure including a tire-forming core, a carriage movable in relation thereto, a guide-sustaining support carried by and movable with the carriage, and a strip-guiding element on the support and positionable thereby opposite a side of the core for applying a strip of material flatwise thereto.

2. A strip-applying structure including a revoluble core, a movable support associated therewith, and a strip-guiding element; the guiding-element and pressing-member being simultaneously positionable by the movable support movable on the support and positionable for active operation opposite a side of the core.

3. A strip-applying structure including a movable support, a strip-guiding element thereon, and a fabric-pressing member juxtaposed to but in a different relative plane from the element for action on a strip in succession to the positioning of the strip by the element.

4. A strip-applying structure including a revoluble core, a strip-guiding element positionable opposite a side of the core for applying a strip of material thereon, and a fabric-pressing member associated with the guiding element for action on the strip in succession to the action of the element in applying the same to the core; both the guiding-element and the pressing-member being simultaneously positionable in relation to the core.

5. A strip-applying structure including a revoluble core, a strip-guiding element positionable opposite a side of the core for applying a strip of material thereon, a fabric-pressing member associated with the guiding element for action on the strip in succession to the action of the element in applying the same to the core, and a fabric-stitching instrumentality operatively associated with the pressing member for action on the strip in succession to the action thereon of that element.

6. A strip-applying structure including an element-sustaining support, a strip-supplying element thereon, a core operatively associated with the supplying element, and a strip-applying device movable radially in relation to the axis of the core and having an independent swinging movement in relation to the side of the core, whereby a strip of material may be successively supplied to, positioned against, and applied to the side of the core.

7. A strip-applying structure including a frame, a material-supplying element thereon, a core supported in operative relation to the supplying element, a strip-applying device positionable in relation to the side of the core and operable to apply a strip to said side from the supplying element, and a material-pressing member juxtaposed, and operating on said strip in succession to the applying device.

8. A strip-applying structure including a frame, material-supplying elements thereon, a revoluble core supported in operative relation to the supplying elements, a strip-applying device positionable in relation to the core and including a supporting-member, a strip-guiding element thereon, and a material-rolling member also disposed on the supporting-member.

9. A strip-applying structure including a frame, material-supplying elements thereon, a revoluble core supported in operative relation to the supplying elements, a strip-applying device positionable in relation to the core and including a supporting-member, a strip-guiding element thereon, a material-rolling member also disposed on the supporting-member, and a material-stitching instrumentality juxtaposed to the guiding element.

10. A strip-applying structure including a frame, material-supplying elements thereon, a revoluble core supported in operative relation to the supplying elements, a strip-applying device positionable in relation to the core and including a supporting-member, a strip-guiding element thereon, a material-rolling member also disposed on the supporting-member in a plane different from that of the guiding element for action on a strip of material in succession to the action of the applying device, and a material-stitching instrumentality juxtaposed to the guiding element.

11. A strip-applying structure including a frame, material-supplying elements thereon, a revoluble core supported in operative relation to the supplying elements, a strip-applying device positionable in relation to the core and including a supporting-member shiftable toward and away from the core, a strip-guiding element thereon, a spring-pressed material-rolling member also disposed on the supporting-member, and a material-stitching instrumentality juxtaposed to the guiding element.

12. A strip-applying structure including a frame, material-supplying elements thereon, a revoluble core supported in operative relation to the supplying elements, means for effecting rotation of the core, a strip-applying device positionable in relation to the core and including a supporting-member shiftable toward and away from the core, a strip-guiding element thereon, a spring-pressed material-rolling member also disposed on the supporting-member and deriving motion by contacting with the core, and a material-stitching instrumentality juxtaposed to the guiding element.

13. A strip-applying structure including a frame, material-supplying elements thereon, a revoluble core supported in operative relation to the supplying elements, a strip-applying device positionable in relation to the core and including a supporting-member, a strip-guiding element thereon, a material-rolling member also disposed on the supporting-member, and a carriage for sustaining the strip-applying device and movable radially in relation to the axis of the core.

14. A strip-applying structure including a frame, material-supplying elements thereon, a revoluble core supported in operative relation to the supplying elements, means for effecting rotation of the core, a strip-applying device positionable in relation to the core and including a supporting-member, a strip-guiding element thereon, a material-rolling member also disposed on the supporting-member and deriving motion by contacting with the rotatable core, and a carriage for sustaining the strip-applying device and movable radially in relation to the axis of the core.

15. A strip-applying structure including a frame, material-supplying elements thereon, a revoluble core supported in operative relation to the supplying elements, a strip-applying device positionable in relation to the core and including a supporting-member, a strip-guiding element thereon and through which fabric from the supplying elements is threaded, a material-rolling member also disposed on the supporting-member in a plane different from that occupied by the rolling-member, and a carriage for sustaining the strip-applying device and movable radially in relation to the axis of the core.

16. A strip-applying structure including a series of revoluble cores, a frame juxtaposed thereto, a series of material-supplying rolls on the frame, a traveling-support movable from core to core, a carriage on the support and having advancing and receding movements in respect to the core, stitcher-supporting arms supported on and movable with the carriage, means common to the arms for actuating them in unison, and a strip-applying device on each arm and positionable thereby in relation to the core.

17. A strip-applying structure including a series of revoluble cores, a frame juxtaposed thereto, a series of material-supplying rolls on the frame, a traveling-support movable from core to core, a carriage on the support and having advancing and receding movements in respect to the core, stitcher-supporting arms supported on and movable with the carriage, means common to the arms for actuating them in unison, and a rip-applying device on each arm and positionable thereby in relation to the core and including a strip-guiding element.

18. A strip-applying structure including a series of revoluble cores, a frame juxtaposed thereto, a series of material-supplying rolls on the frame, a traveling-support movable from core to core, a carriage on the support and having advancing and receding movements in respect to the core, stitcher-supporting arms supported on and movable with the carriage, means common to the arms for actuating them in unison, and a strip-applying device on each arm and positionable thereby in relation to the core, including a strip-guiding element and a material-rolling member juxtaposed thereto.

19. A strip-applying structure including a series of revoluble cores, a frame juxtaposed thereto, a series of material-supplying rolls on the frame, a traveling-support movable from core to core, a carriage on the support and having advancing and receding movements in respect to the core, stitcher-supporting arms supported on and movable with the carriage, means common to the arms for actuating them in unison, and a strip-applying device on each arm and positionable thereby in relation to the core, including a strip-guiding element, a material-rolling member juxtaposed thereto, and a stitcher-instrumentality disposed adjacent the guiding-element.

20. A strip-applying structure including a series of revoluble cores, a roll-sustaining support associated with the cores, a plurality of material-supplying rolls on the support, there being a series of the rolls for each core, a traveling-support movable from core to core and in relation to each series of rolls, a carriage on the support and having advancing and receding movements in respect to the core, stitcher-supporting arms supported on and movable with the carriage, means common to the arms for actuating them in unison, and a strip-applying device on each arm and positionable thereby in relation to the core, including a strip-guiding element, a material-rolling member juxtaposed thereto, a stitcher-instrumentality disposed adjacent the guiding-element, and liner take-up rolls juxtaposed on the frame and contacting by force of gravity with the material-supplying rolls.

21. A strip-supplying structure including a revoluble core, a fabric-supplying element associated with the core, and a strip-applying device associated with the core and supplying-element and comprising a support, a strip-positioning element, and an associated fabric-pressing member on the support, both the strip-positioning element and the pressing-member being actuatable by the support toward and away from the core simultaneously and functioning successively to apply a fabric-strip to the core and, then, to press the same thereon.

22. The herein described structure including a plurality of juxtaposed tire-forming cores, a series of fabric-supplying devices associated with each core, a traveling support movable from core to core and, thus, positionable in relation to each of the fabric-supplying devices, and a strip-applying device on the traveling support and operable to lay a strip of material on one of the cores.

23. A strip-applying structure including a series of juxtaposed tire-forming cores, a fabric-supplying device associated with each core, a strip-applying device for laying fabric onto the core as it is delivered to the core from the fabric-supplying device, and a movable support for the strip-applying device for shifting it from core to core.

In witness whereof, I have hereunto signed my name in the presence of two subscribing witnesses.

WILLIAM B. HARSEL.

Witnesses:
R. S. TROGNER,
E. C. LEADENHAM.